United States Patent
Autef

(10) Patent No.: US 10,472,282 B2
(45) Date of Patent: Nov. 12, 2019

(54) PARTICULATE COMPOSITIONS FOR THE FORMATION OF GEOPOLYMERS, THEIR USE AND METHODS FOR FORMING GEOPOLYMERS THEREWITH, AND GEOPOLYMERS OBTAINED THEREFROM

(71) Applicant: ImerTech SAS, Paris (FR)

(72) Inventor: Alexandre Autef, Paris (FR)

(73) Assignee: ImerTech SAS, Paris (FR)

( * ) Notice: Subject to any disclaimer, the term of this patent is extended or adjusted under 35 U.S.C. 154(b) by 99 days.

(21) Appl. No.: 15/553,691

(22) PCT Filed: Feb. 29, 2016

(86) PCT No.: PCT/EP2016/054251
§ 371 (c)(1),
(2) Date: Aug. 25, 2017

(87) PCT Pub. No.: WO2016/135347
PCT Pub. Date: Sep. 1, 2016

(65) Prior Publication Data
US 2018/0022646 A1 Jan. 25, 2018

(30) Foreign Application Priority Data
Feb. 27, 2015 (EP) .................................... 15290051

(51) Int. Cl.
*C04B 28/00* (2006.01)
*C04B 12/00* (2006.01)
*C04B 18/02* (2006.01)
*C04B 40/00* (2006.01)

(52) U.S. Cl.
CPC .......... *C04B 28/006* (2013.01); *C04B 12/005* (2013.01); *C04B 18/02* (2013.01); *C04B 40/0042* (2013.01); *Y02P 40/165* (2015.11); *Y02W 30/92* (2015.05); *Y02W 30/94* (2015.05)

(58) Field of Classification Search
CPC ......... C04B 12/04; C04B 14/06; C04B 14/10; C04B 14/106; C04B 14/20; C04B 18/08; C04B 18/141; C04B 22/062; C04B 24/20; C04B 24/2641; C04B 24/2652; C04B 24/2676; C04B 24/2682; C04B 24/281; C04B 24/383; C04B 28/006; C04B 40/0608
See application file for complete search history.

(56) References Cited

U.S. PATENT DOCUMENTS

| | | | | |
|---|---|---|---|---|
| 4,042,137 | A * | 8/1977 | Hughes | B65F 1/122 414/406 |
| 4,509,985 | A * | 4/1985 | Davidovits | C04B 14/04 106/624 |
| 5,539,140 | A * | 7/1996 | Davidovits | C04B 12/005 106/607 |
| 9,090,508 | B2 * | 7/2015 | Gong | C04B 28/006 |
| 9,919,974 | B2 * | 3/2018 | Gong | C04B 38/02 |
| 10,029,945 | B2 * | 7/2018 | Werz | C04B 28/00 |
| 2011/0132230 | A1 | 6/2011 | Han et al. | |
| 2012/0152153 | A1 * | 6/2012 | Gong | C04B 28/006 106/705 |
| 2012/0240825 | A1 * | 9/2012 | Gehrig | C04B 28/021 106/708 |
| 2012/0304894 | A1 | 12/2012 | Abdullah et al. | |

FOREIGN PATENT DOCUMENTS

| | | | |
|---|---|---|---|
| CN | 103 449 744 A | 12/2013 | |
| CN | 103449744 A * | 12/2013 | ........... C04B 28/006 |
| WO | WO 2014/146173 A1 | 9/2014 | |

OTHER PUBLICATIONS

International Search Report and Written Opinion dated Apr. 28, 2016, in International Application No. PCT/EP2015/050581 (11 pgs.).

H.A Abdel-Gawwad et al., "A novel method to produce dry geopolymer cement powder", HBRC Journal, Jul. 1, 2014, Retrieved from the Internet: URL:http://dx.doi.org/10.1016/j.hbrcj.2014.06.008. 12 pages.

* cited by examiner

*Primary Examiner* — Anthony J Green
(74) *Attorney, Agent, or Firm* — Finnegan, Henderson, Farabow, Garrett & Dunner LLP

(57) ABSTRACT

The present invention relates to dry particulate composition for forming a geopolymer, comprising an alkali metal hydroxide, an alkali metal silicate, and an aluminosilicate. The invention further relates to methods for forming geopolymers and geopolymers formed according to said methods or using the said dry particulate composition.

19 Claims, 1 Drawing Sheet

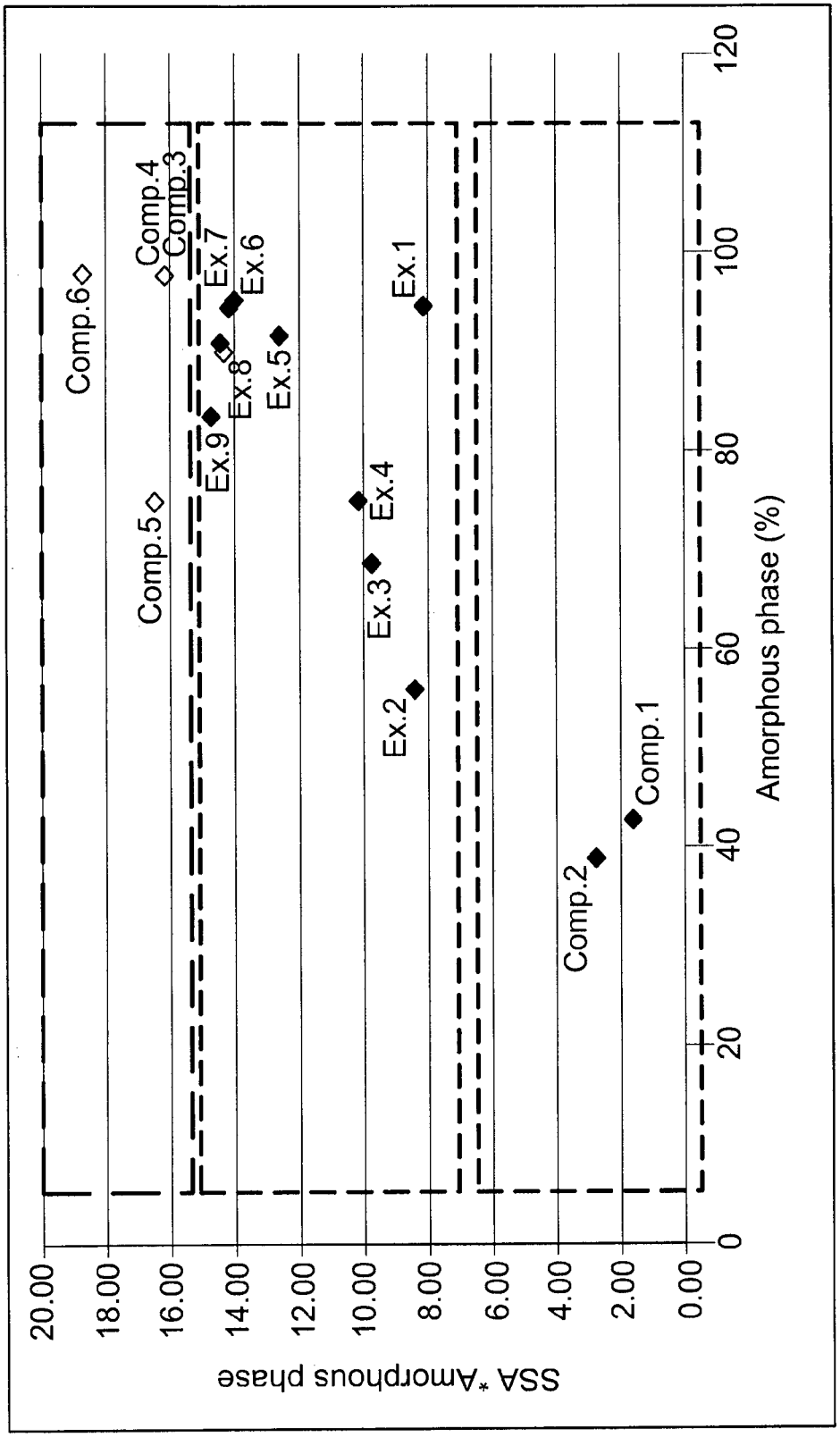

PARTICULATE COMPOSITIONS FOR THE FORMATION OF GEOPOLYMERS, THEIR USE AND METHODS FOR FORMING GEOPOLYMERS THEREWITH, AND GEOPOLYMERS OBTAINED THEREFROM

CLAIM FOR PRIORITY

This application is a U.S. national phase entry under 35 U.S.C. § 371 from PCT International Application No. PCT/EP2016/054251, filed Feb. 29, 2016 which claims the benefit of priority of EP Application No. 15290051.0, filed Feb. 27, 2015, to both of which this application claims priority and both of which are incorporated herein by reference.

FIELD OF THE INVENTION

The present invention relates to geopolymers in general, and specifically to dry particulate compositions for forming geopolymers. The use of the said dry particulate compositions, and methods for making geopolymers are also part of the present invention, as are further geopolymer precursors and the finished geopolymers derived therefrom.

BACKGROUND OF THE INVENTION

Recently, a new class of materials known as geopolymers has emerged in cement concrete products. Geopolymers are not only considered to be a potential alternative to standard cement, but they also present an opportunity to convert a variety of industrial wastes into interesting by-products. Because geopolymers can exhibit good mechanical strength and resistance in front of alterations by aggressive environments, they are currently attracting great interest for their potential use in simultaneously improving both environmental and engineering performance compared with traditional technologies. Geopolymers are conventionally formed by polymerisation of aluminosilicate oxides in the presence of a strongly basic activating agent. According to the state of the art, the polymerisation is initiated by a liquid alkaline silicate. This is generally favoured by the reaction mechanisms as described in the scientific literature: In accordance with Fernández-Jiménez A. et al. (Cement and Concrete Research, 35 (6), pages 1204 to 1209, 2005), a dissolution of a solid aluminosilicate by alkaline hydrolysis is the first reaction step and leads to the formation of aluminates and silicates. Once a formation equilibrium is obtained, a saturated solution is formed which leads to a network of oligomers that undergo polycondensation to form a three-dimensional network of aluminosilicates. This process requires a very large amount of water that subsequently is partially removed from the product.

Recently, some research has been focussed on providing precursors for forming geopolymers that may be easily stored, handled and transported, in order to obtain the finished product on sites where it is required. Ideally, the finished product may be obtained by simply adding water to a precursor and forming a geopolymer that way.

US 2011/0132230 A1 (Han et al.) discloses dry mixtures as geopolymeric precursors, comprising a water soluble metal silicate powder and aluminosilicate powder. The geopolymeric precursors may further comprise supplemental ingredients, such as for example, but not necessarily, a particulate solid alkali base. These dry mixtures require a high amount of water to be added in order to produce a geopolymer product. Furthermore, the aluminosilicate present requires a high content of amorphous phase, such as 90 wt.-% or greater.

It is an object of the present invention to provide a dry mixture having a low water demand for forming geopolymers with the desired mechanical properties.

It is a further object of the present invention is to provide a process for preparing a geopolymer on site by just adding water.

SHORT DESCRIPTION OF THE INVENTION

The present invention is defined in the appended claims. The first embodiment of the present invention is directed to a dry particulate composition for forming a geopolymer. This dry particulate composition may also be indifferently called dry mix or premix for forming a geopolymer.

In particular, the present invention is embodied by a dry particulate composition for forming a geopolymer, comprising an alkali metal hydroxide, an alkali metal silicate, and an aluminosilicate, wherein at least 45 wt.-% of the aluminosilicate is in an amorphous state, based on the total weight of aluminosilicate in the composition, such as for example where at least 50 wt.-% of the aluminosilicate is in an amorphous state. It was found that such compositions have improved properties when it comes to ease of handling and preparing the finished geopolymer on site.

In a separate embodiment, the present invention consists in a dry particulate composition for forming a geopolymer, comprising an alkali metal hydroxide, an alkali metal silicate, and an aluminosilicate, wherein the aluminosilicate has a product of specific surface area (in $m^2/g$) by amorphous phase content in the range from 1 to 15, such as for example from 5 to 15. It was found that such compositions have improved properties when it comes to ease of handling.

In one embodiment of the present invention, the dry particulate composition may comprise from 1 wt.-% to 25 wt.-% alkali metal hydroxide, from 15 wt.-% to 50 wt.-% alkali metal silicate, and from 30 wt.-% to 80 wt.-% aluminosilicate, each expressed as a proportion of the total weight of the dry particulate composition. It was found that, depending on the source and quality of raw materials used, best results were obtained using the constituents of the composition according to the present invention in said quantities.

In one embodiment of the present invention, the alkali metal hydroxide in the dry particulate composition may be selected from the group consisting of NaOH, KOH, LiOH, RbOH, CsOH, and mixtures thereof. It was found that said alkali metal hydroxides afforded best results in practice.

In one embodiment of the present invention, the aluminosilicate in the dry particulate composition may be selected from the group consisting of metakaolin, fly ash, halloysite, metahalloysite, slag, rock dust, fine sand, activated clay, kaolin, mica, fine feldspar and mixtures thereof. It was found that said aluminosilicates afforded best results in practice. As used herein, aluminosilicates are minerals composed of aluminium, silicon and oxygen. Depending on its sourcing, the aluminosilicate content in Al, Si and O may vary, as well as the content in inert constituents (e.g. quartz, cristoballite, mullite, muscovite, mica, anatase, rutile, kaolinite, albite, orthoclase).

In one embodiment of the present invention, the dry particulate composition may further comprise a filler selected from the group consisting of mica, fireclay, quartz, quartz sands, silica fume, talc, andalusite, wollastonite, glass cullets, fibres or mixtures thereof.

Also part of the present invention is a method for preparing a geopolymer comprising the step of mixing the dry particulate composition of the present invention with water. It was found that the said method allowed to more easily provide finished geopolymers on site, combining the advantages of the compositions according to the present invention with a reduced water demand in obtaining the finished product.

According to one embodiment of the present invention, the amount of water is less than 50 wt.-%, for example in the range of 10 wt.-% to 50 wt.-%, such as for example in the range of 15 wt.-% to 50 wt.-%, based on the total weight of particulate composition and water. It was found that accordingly, best results for the final geopolymeric product could be obtained.

According to one embodiment of the present invention, the said method for preparing a geopolymer may be carried out at a temperature between 0° C. and 100° C., and using any type of water, such as distilled water or tap water. It was found that the method according to the present invention could be used in a wide temperature range and without particular requirements to the source of water on site.

According to one embodiment of the present invention, the said method for preparing a geopolymer may comprise the further step of addition of aggregates or other additives after addition of water and prior to geopolymerisation of the mixture.

Also part of the present invention is a geopolymer composition obtained using a dry particulate composition for forming a geopolymer according to the present invention, or a method for preparing a geopolymer according to the present invention, or both, as well as the use of the geopolymers in the production of articles, and the articles incorporating the geopolymers. It was found that the geopolymers obtained according to the present invention provided advantages as to the handling of the precursor materials and the method of obtaining the actual product on site, while displaying all the advantageous properties of state of the art geopolymers.

SHORT DESCRIPTION OF THE FIGURES

The invention will be further illustrated by reference to the following FIGURE:

FIG. 1 is a graph representing the relationship between the amorphous phase content and the product of specific surface area (in m²/g) by amorphous phase content of the samples used in Examples 1 to 9 and Comparative Examples 1 to 6.

It is understood that the following description and references to the figures concern exemplary embodiments of the present invention and shall not be limiting the scope of the claims.

DETAILED DESCRIPTION OF THE INVENTION

The present invention according to the appended claims provides, according to one embodiment, for precursor compositions useful in the production of geopolymeric materials. The precursor compositions according to the present invention are dry particulate compositions, which can be used to form a geopolymer by adding water. The main advantage of the compositions according to the present invention lies in the elimination of the use of strongly basic and corrosive alkaline solutions at the stage of forming the actual geopolymer. Furthermore, the time of obtaining the finished geopolymer on site is reduced due to the single-step process of mixing the precursor with water, wherein the reaction does not require the step of decomposition of oligomers present in an alkali silicate solution.

According to the present invention, a geopolymer can be obtained by combining a dry particulate geopolymer precursor mixture and water. The present invention relies on the principle of different solubility rates of the various components of the dry particulate precursor. The alkaline sources (alkali metal hydroxide and alkali metal silicate) need to have a faster dissolution rate in water in order to move into solution more quickly and provide a reaction mixture to dissolve the aluminosilicate.

According to the present invention, the geopolymer precursor compositions are suitable for a dissolution-geopolymerisation process comprising the steps of (i) rapid dissolution of the alkali source to provide a highly basic (pH>12) reaction mixture; and (ii) limited reaction rate of the aluminosilicate to allow dissolution of the aluminosilicate only after dissolution of the alkali sources. The successive dissolutions of the various precursors lead to the provision of a reaction mixture in which a geopolymerisation reaction occurs at temperatures between 0° C. and 100° C.

The rate of reactivity of the aluminosilicate may be dependent, among other factors, on the relative amount of amorphous phase in the aluminosilicate. The amorphous phase content depends on the amount of species that may be dissolved in a basic medium and which can then participate in the geopolymerisation reaction. The amount of amorphous phase is determined by X-ray diffraction (Rietveld refinement method). According to one embodiment of the invention, that the amorphous phase content can be at least 45 wt.-%, based on the total weight of aluminosilicate in the composition. For example, the amorphous phase content of the aluminosilicate may be at least 50 wt.-%, at least 55 wt.-%, at least 60 wt.-%, or at least 70 wt.-%, or at least 80 wt.-%, or even at least 90 wt.-%, based on the total weight of aluminosilicate in the composition.

The rate of reactivity of the aluminosilicate may also depend on the specific surface area of the aluminosilicate. A higher specific surface are of the aluminosilicate leads to a higher reaction rate. It has been found surprisingly that the product of the specific surface area and the amorphous content of the aluminosilicate shows a good correlation with the suitability of the aluminosilicate to provide added advantages according to the present invention. According to one embodiment of the invention, it is therefore required that the product of the specific surface area (in m²/g) and the amorphous phase content is in the range from 1 to 15, such as for example from 5 to 15, or from 7 to 15, or from 8 to 15, or from 10 to 15. If the product of the specific surface area (in m²/g) and the amorphous phase content is too low, then no geopolymerisation occurs, because the amount of amorphous phase is not sufficient. If the product is above 15, the reaction is not complete, and the obtained products are non-geopolymeric species having very low cohesion and insufficient mechanical properties.

The aluminosilicates for use in the present invention may be obtained by grinding the raw materials. In the case of kaolin, the particulate matter may then be calcined, for example using oven or furnace calcination, or using fly ash calcination. Finally, the particulate materials are subjected to size classification, using a sieve, or a mesh, or an air classifier, for example, in order to break down or filter out any aggregates above a certain diameter that may have formed. The aluminosilicate particles may still be in the form of aggregates, or particles, while the aggregates or particles have a top cut ($d_{100}$) maximum diameter.

According to an embodiment of the present invention, the aluminosilicate aggregates have a D100 size of less than 300 μm, or less than 200 μm, or less than 150 μm, such as for example less than 120 μm, or less than 100 μm, or less than 90 μm, or less than 80 μm. According to another embodiment, the aluminosilicate aggregates are such that at least 95% have a D100 size of less than 300 μm, or less than 200 μm, for example at least 97%, at least 98% or at least 99%. According to another embodiment, the aluminosilicate aggregates are such that at least 90% have a D100 size of less than 200 μm, or less than 150 μm, for example at least 95%, at least 97% or at least 99%. According to another embodiment, the aluminosilicate aggregates are such that at least 80% have a D100 size of less than 100 μm, for example at least 85%, at least 90% or at least 95%. As used herein, a particle size of less than 300 μm requires that after calcination, the aluminosilicate aggregates have passed through e.g. a sieve, a mesh or an air classifier having a diameter of 300 μm, effectively leading to a top-cut of particle diameter of 300 μm. The same applies to all other values of particle size.

According to the present invention, a geopolymeric material may be formed upon addition of water to the dry particulate composition. The amount of water introduced into the dry particulate composition should be such that the water content of the obtained mixture of particulate material and water is less than 50 wt.-%, such as for example from 10 wt.-% to 50 wt.-%. For example, the amount of water may be from 15 wt.-% to 40-wt.-%, or the amount of water may be from 20 wt.-% to 35-wt.-%, such as for example 25 wt.-%, or about 28 wt.-% or about 30 wt.-% or about 32 wt.-%. Such amounts of water provide ideal conditions to dissolve all species and the geopolymerisation reaction is complete. If there is not enough water, not all species (Si and Al) are dissolved because the reaction medium becomes saturated, and the geopolymerisation reaction remains incomplete. If there is too much water, the pH of the reaction mixture decreases and the dissolution of all the species is not achieved. Furthermore, the low concentration in Si and Al species limits the formation of bonds between the atoms and therefore prevents the formation of a geopolymeric network. Again, the geopolymerisation reaction remains incomplete.

According to the present invention, the aluminosilicate may be selected from the group consisting of metakaolin, fly ash, halloysite, metahalloysite, slag, rock dust, fine sand, activated clay, and mixtures thereof. AU these aluminosilicates have advantageous properties. It is particularly advantageous for the present invention to use an aluminosilicate with a low water demand. In one embodiment, the aluminosilicate for use in the invention is a metakaolin.

According to the present invention, the alkali metal hydroxide may be one of NaOH, KOH, LiOH, RbOH, or CsOH, or a mixture thereof. Preferred alkali metal hydroxides are NaOH, KOH, and LiOH.

According to the present invention, the alkali metal silicate for use in the dry particulate composition may be selected from the group consisting of Na, K, Li, Rb, Cs, and mixtures thereof. In particular, the alkali metal silicate may be sodium silicate, sodium metasilicate (waterglass) and/or potassium silicate.

According to one embodiment of the present invention, the dry particulate composition for forming a geopolymer, comprises: (i) NaOH as the alkali metal hydroxide, (ii) sodium silicate as the alkali metal silicate, and (iii) metakaolin as the aluminosilicate, wherein at least 45 wt.-% of said metakaolin is in an amorphous state, based on the total weight of metakaolin in the composition and wherein the metakaolin has a product of the specific surface area in m²/g and the amorphous phase content in the range from 1 to 15.

According to one further embodiment of the present invention, the dry particulate composition for forming a geopolymer, comprises (i) NaOH as the alkali metal hydroxide, (ii) sodium silicate as the alkali metal silicate, and (iii) metakaolin as the aluminosilicate, wherein at least 70 wt.-% of said metakaolin is in an amorphous state, based on the total weight of metakaolin in the composition and wherein the metakaolin has a product of the specific surface area in m²/g and the amorphous phase content in the range from 10 to 15.

According to one further embodiment of the present invention, the dry particulate composition for forming a geopolymer of the present invention comprises (i) an alkali metal hydroxide, (ii) an alkali metal silicate, and (iii) an aluminosilicate-containing compound, wherein at least 45 wt.-% of said aluminosilicate is in an amorphous state, based on the total weight of aluminosilicate in the composition and wherein the aluminosilicate has a product of the specific surface area in m²/g and the amorphous phase content in the range from 1 to 15, with the exclusion of an aluminosilicate having an amorphous phase content of 68.9%, based on the total weight of aluminosilicate in the composition and a product of the specific surface area in m²/g and the amorphous phase content of 9.78.

According to the present invention, the dry particulate composition may comprise one or more fillers selected from the group consisting of mica, fireclay, quartz, quartz sands, silica fume, talc, andalusite, wollastonite, glass cullets, fibres or mixtures thereof.

According to the present invention, the dry particulate composition may comprise from 1 wt.-% to 25 wt.-% alkali metal hydroxide, from 15 wt.-% to 50 wt.-% alkali metal silicate, and from 30 wt.-% to 80 wt-% aluminosilicate, expressed as a proportion of the total weight of the dry particulate composition. For example, the dry particulate composition may comprise from 2 wt.-% to 15 wt.-% alkali metal hydroxide, or from 5 wt.-% to 10 wt.-% alkali metal hydroxide, such as for example about 6 wt-% alkali metal hydroxide, or about 7 wt-% alkali metal hydroxide, or about 8 wt-% alkali metal hydroxide, or about 9 wt-% alkali metal hydroxide. For example, the dry particulate composition may also comprise from 20 wt.-% to 40 wt. % alkali metal silicate, such as from 25 wt.-% to 35 wt. % alkali metal silicate, for example about 28 wt.-% alkali metal silicate, or about 30 wt.-% alkali metal silicate, or about 32 wt.-% alkali metal silicate. For example, the dry particulate composition may also comprise from 40 to 75 wt.-% aluminosilicate, or from 50 to 70 wt.-% aluminosilicate, or from 55 to 65 wt.-% aluminosilicate, such as for example about 58 wt.-% aluminosilicate, or about 60 wt.-% aluminosilicate, or about 62 wt.-% aluminosilicate.

According to the present invention a method for forming a geopolymer using one of the dry particular compositions described above also forms a part of the invention. The method comprises adding water to the dry particulate composition, wherein the amount of water may be such that the water content of the obtained mixture of particulate material and water may be less than 50 wt.-%, such as from 10 wt.-% to 50 wt.-?/0, or from 15 wt.-% to 50 wt.-%. Upon addition of water, the alkali metal hydroxide and the alkali metal silicate rapidly pass into solution, which is an exothermic process, and a rise of temperature is detected. After homogenising the mixture, this is left to react and after no more than 24 hours, such as for example after 12 hours, a finished geopolymeric product is formed. Aggregates or other materials may be added to the homogenised mixture prior to geopolymerisation, as may be required.

The dry particulate compositions according to the present invention may be used in the formation of geopolymers for use in the production of various products or articles, such as for example mortars, concretes, cements, coatings, waste management articles for toxic or nuclear waste immobilization, geopolymeric high-tech/fiber reinforced composites, geopolymeric foams, e.g. for insulation, fire-proof coatings, foundry equipment, bricks, resins, binders, roads, pavements, or the like. These products and articles also form part of the present invention.

Also part of the present invention is a geopolymer comprising 50 wt.-% or more of the dry particulate composition of the present invention and up to 50 wt.-% water. For example, the geopolymer may comprise 60 wt.-% or more of the dry particulate composition of the present invention and up to 40 wt.-% water, or the geopolymer may comprise 70 wt.-% or more of the dry particulate composition of the present invention and up to 30 wt.-% water, or the geopolymer may comprise 80 wt.-% or more of the dry particulate composition of the present invention and up to 20 wt.-% water, or the geopolymer may comprise 90 wt.-% or more of the dry particulate composition of the present invention and up to 10 wt.-% water.

It should be noted that the present invention may comprise any combination of the features and/or limitations referred to herein, except for combinations of such features which are mutually exclusive. The foregoing description is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

EXAMPLES

Examples 1 to 9

A number of commercially available aluminosilicates (listed here as Comparative Examples 1 to 6 and Examples 1 to 9) were tested for use in a dry particulate composition according to the present invention, by forming geopolymers using said aluminosilicates under otherwise constant conditions. The kaolins used in Examples 1, 3, 6, 8 and Comp. Ex. 6 were calcined at 750° C. during 3 hours. After calcination, the products were sieved at 80 μm. Metakaolins were used in Comp. Ex. 1 to 5 and Examples 2, 4, 5, 7 and 9. The properties of these aluminosilicates are listed in Table I and their origins are listed in Table II:

TABLE I

| | Aluminosilicate properties | | |
|---|---|---|---|
| | amorphous phase (wt.-%) | specific surface area (m²/g) | product ap × ssa |
| Comp. Ex. 1 | 43.3 | 3.7 | 1.60 |
| Comp. Ex. 2 | 39.5 | 7.0 | 2.76 |
| Example 1 | 94.7 | 8.7 | 8.24 |
| Example 2 | 56.2 | 15.2 | 8.54 |
| Example 3 | 68.9 | 14.2 | 9.78 |
| Example 4 | 75.3 | 13.6 | 10.24 |
| Example 5 | 91.8 | 13.9 | 12.76 |
| Example 6 | 95.4 | 14.7 | 14.02 |
| Example 7 | 95.0 | 14.9 | 14.15 |
| Example 8 | 90.7 | 16.0 | 14.51 |
| Example 9 | 83.6 | 17.7 | 14.80 |
| Comp. Ex. 3 | 97.0 | 15.6 | 15.13 |
| Comp. Ex. 4 | 98.0 | 16.6 | 16.27 |
| Comp. Ex. 5 | 74.9 | 22.0 | 16.48 |
| Comp. Ex. 6 | 98.0 | 19.2 | 18.82 |

"Product ap × ssa" is the product of the specific surface area in m²/g and the amorphous phase content

TABLE II

| | Aluminosilicate | Commercial name | Provider |
|---|---|---|---|
| Comp. Ex. 1 | metakaolin | METASIAL B | SOCIETE KAOLINIERE ARMORICAINE (SOKA) |
| Comp. Ex. 2 | metakaolin | Argicem | Argeco |
| Example 1 | kaolin | Remblend | Imerys |
| Example 2 | metakaolin | Metaver R | NEWCHEM AG |
| Example 3 | kaolin | Pioneer | Imerys |
| Example 4 | metakaolin | MK40 | Imerys |
| Example 5 | metakaolin | Metakaolin S Meta 4 | Sedlecky-kaolin |
| Example 6 | kaolin | (Non-commercial) | Imerys |
| Example 7 | metakaolin | Metakaolin N Meta 4 | Sedlecky-kaolin |
| Example 8 | kaolin | Hywite HK2 | Imerys |
| Example 9 | metakaolin | Metakaolin I Meta 4 | Sedlecky-kaolin |
| Comp. Ex. 3 | metakaolin | Polestar450 | Imerys |
| Comp. Ex. 4 | metakaolin | Metastar501 | Imerys |
| Comp. Ex. 5 | metakaolin | Argical-M 1200S | Imerys |
| Comp. Ex. 6 | kaolin | SBF | Imerys |

The amount of amorphous phase in the aluminosilicate may be determined, for example, by quantitative X-Ray Diffraction as obtained by acquiring an X-Ray diffractogram on <40 μm unoriented aluminosilicate powder with 30% zincite as internal standard and modelling the diffractogram by Topas software (Bruker).

As used herein, "surface area" refers to a BET surface area. "BET surface area," as used herein, refers to the technique for calculating specific surface area of physical absorption molecules according to Brunauer, Emmett, and Teller ("BET") theory. BET surface area can be measured with a Gemini III 2375 Surface Area Analyzer, using nitrogen as the sorbent gas, from Micromeritics Instrument Corporation (Norcross, Ga., USA).

The aluminosilicates of Comparative Examples 1 and 2 have an amorphous phase content outside the boundaries of the present invention. The aluminosilicates of Comparative Examples 3 to 6 have their product of the specific surface area in m²/g and the amorphous phase content outside the boundaries of the present invention. All the aluminosilicates according to Examples 1 to 9 have an amorphous phase content and a product of the specific surface area in m2/g and the amorphous phase content within the boundaries of the present invention.

All samples were used in a method of preparing a geopolymer, analogously as described in Example 10 below. It was found that for Examples 1 to 9, a geopolymer was formed, according to the method of the present invention, essentially consisting of the addition of water to a dry particulate composition according to the present invention, with the aluminosilicate as selected according to Table I. In Comparative Examples 1 and 2, no consolidation reaction was observed. In Comparative Examples 3 to 6, a consolidation of the mixture was observed, however the product was not a geopolymer, and the resulting material had reduced cohesion and unsatisfactory mechanical properties (e.g. flexural strength below 1 MPa). On the other hand, the geopolymer prepared using an aluminosilicate according to any of examples 1 to 9 show satisfactory mechanical properties (e.g. flexural strength above 1 MPa).

Example 10

A dry particulate composition according to the present invention was formed using a metakaolin (corresponding to Example 8 above), sodium silicate powder ("Britesil C205", provided by PQ Corporation) and sodium hydroxide fine pastilles (provided by Sigma Aldrich). The metakaolin used was provided by IMERYS and has a composition of $SiO_2$ (50.2%), $Al_2O_3$ (39.6%), $K_2O$ (0.62%), $Na_2O$ (0.01%), and other components (8.7%), with a loss on ignition of 0.9%. The particulate composition was mixed manually and had a composition of metakaolin (61.6 wt.-%), sodium hydroxide (7.6 wt.-%) and sodium silicate (30.75%).

Water was added and the mixture homogenised by mechanical stirring. The amount of water added was such that the final composition would notionally comprise the following proportions: metakaolin (42.57 wt.-%), sodium hydroxide (5.28 wt.-%), sodium silicate (21.25%), and water (30.90 wt.-%). Upon homogenistation, the mixture warmed from room temperature to about 55° C., due to the exothermic dissolution of sodium hydroxide and sodium silicate in water. The reaction mixture was then placed into a hermetically sealed tube for 24 hours. After removal of the reaction from the tube, the product had hardened. The obtained product was ground and both the ground product and the starting metakaolin were analysed by X-ray diffraction.

The diffractogram of the starting metakaolin showed a characteristic non-symmetrical broad peak of an amorphous phase between 20 and 35° (2θ), with a maximum at about 25°. In the product composition, this peak was shift to 25 to 40°, with a maximum at about 35°. This shows that a geopolymeric species was formed in the process according to this invention.

The invention claimed is:

1. A dry particulate composition for forming a geopolymer, comprising:
   (i) an alkali metal hydroxide,
   (ii) an alkali metal silicate, and
   (iii) an aluminosilicate,
wherein at least 45 wt.-% of the aluminosilicate is in an amorphous state, based on the total weight of aluminosilicate in the composition, and the aluminosilicate has a product of the specific surface area in $m^2/g$ and the amorphous phase content in the range from 5 to 15.

2. A dry particulate composition according to claim 1, wherein at least 50 wt.-% of the aluminosilicate is in an amorphous state.

3. A dry particulate composition according to claim 1, comprising from 1 wt.-% to 25 wt.-% alkali metal hydroxide, from 15 wt.-% to 50 wt.-% alkali metal silicate, and from 30 wt.-% to 80 wt.-% aluminosilicate, expressed as a proportion of the total weight of the dry particulate composition.

4. A dry particulate composition according to claim 1 wherein the said alkali metal hydroxide is selected from the group consisting of NaOH, KOH, LiOH, RbOH, CsOH, and mixtures thereof.

5. A dry particulate composition according to claim 1, wherein the alkali metal of the said alkali metal silicate is selected from the group consisting of Na, K, Li, Rb, Cs, and mixtures thereof.

6. A dry particulate composition according to claim 1, wherein said aluminosilicate is selected from the group consisting of metakaolin, fly ash, halloysite, metahalloysite, slag, rock dust, sand, activated clay, kaolin, mica, feldspar and mixtures thereof.

7. A dry particulate composition according to claim 1, wherein at least 70 wt.-% of said aluminosilicate is in an amorphous state, based on the total weight of aluminosilicate in the composition and said aluminosilicate has a product of the specific surface area in $m^2/g$ and the amorphous phase content in the range from 10 to 15.

8. A dry particulate composition according to claim 1, wherein the aluminosilicate in the amorphous state has a specific surface area in the range from 7 to 15 $m^2/g$.

9. A geopolymer obtained by mixing a dry particulate composition with water, wherein the dry particulate composition comprises (i) an alkali metal hydroxide, (ii) an alkali metal silicate, and (iii) an aluminosilicate, wherein at least 45 wt.-% of the aluminosilicate is in an amorphous state, based on the total weight of aluminosilicate in the composition, and the aluminosilicate has a product of the specific surface area in $m^2/g$ and the amorphous phase content in the range from 5 to 15.

10. The geopolymer according to claim 9, wherein the amount of water is 50 wt.-% or less, based on the total weight of particulate composition and water.

11. The geopolymer according to claim 9, wherein the geopolymer further comprises aggregated materials after the addition of water and prior to geopolymerisation of the mixture.

12. The geopolymer according to claim 9, wherein the geopolymer is used in products or articles selected from mortars, concretes, cements, coatings, waste management articles for toxic or nuclear waste immobilization, geopolymeric high-tech/fiber reinforced composites, geopolymeric foams, insulation, fire-proof coatings, foundry equipment, bricks, resins, binders, roads, or pavements.

13. The geopolymer according to claim 9, wherein at least 50 wt.-% of the aluminosilicate is in an amorphous state.

14. The geopolymer according to claim 9, wherein the dry particulate composition comprises from 1 wt.-% to 25 wt.-% alkali metal hydroxide, from 15 wt.-% to 50 wt.-% alkali metal silicate, and from 30 wt.-% to 80 wt.-% aluminosilicate, expressed as a proportion of the total weight of the dry particulate composition.

15. The geopolymer according to claim 9, wherein said aluminosilicate is selected from the group consisting of metakaolin, fly ash, halloysite, metahalloysite, slag, rock dust, sand, activated clay, kaolin, mica, feldspar and mixtures thereof.

16. The geopolymer according to claim 9, wherein at least 50 wt. % of said aluminosilicate is in an amorphous state, based on the total weight of aluminosilicate in the composition.

17. The geopolymer according to claim 9, wherein at least 70 wt. % of said aluminosilicate is in an amorphous state, based on the total weight of aluminosilicate in the composition and said aluminosilicate has a product of the specific surface area in $m^2/g$ and the amorphous phase content in the range from 10 to 15.

18. The geopolymer according to claim 9, wherein the aluminosilicate in the amorphous state has a specific surface area in the range from 7 to 15 $m^2/g$.

19. A dry particulate composition for forming a geopolymer, comprising: (i) an alkali metal hydroxide, (ii) an alkali metal silicate, and (iii) an aluminosilicate, wherein at least 45 wt.-% of the aluminosilicate is in an amorphous state, based on the total weight of aluminosilicate in the composition, and the aluminosilicate has a product of the specific surface area in $m^2/g$ and the amorphous phase content in the range from 1 to 15 and wherein the aluminosilicate has a specific surface area in the range from 7 to 15 $m^2/g$.

* * * * *

UNITED STATES PATENT AND TRADEMARK OFFICE
CERTIFICATE OF CORRECTION

PATENT NO. : 10,472,282 B2
APPLICATION NO. : 15/553691
DATED : November 12, 2019
INVENTOR(S) : Alexandre Autef Page 1 of 1

It is certified that error appears in the above-identified patent and that said Letters Patent is hereby corrected as shown below:

On the Title Page

Item [57], Line 6, "the said dry particulate composition." should read -- the said dry particulate compositions. --

Signed and Sealed this
Thirty-first Day of March, 2020

Andrei Iancu
*Director of the United States Patent and Trademark Office*